March 22, 1966  S. GUARNASCHELLI  3,241,867
ROTATABLE PIPE JOINT
Filed March 23, 1965

INVENTOR.
STEPHEN GUARNASCHELLI
BY James P. Malone

United States Patent Office

3,241,867
Patented Mar. 22, 1966

3,241,867
ROTATABLE PIPE JOINT
Stephen Guarnaschelli, 33 Vassar St., Garden City,
Long Island, N.Y.
Filed Mar. 23, 1965, Ser. No. 444,928
7 Claims. (Cl. 285—109)

This application is a continuation in part of my prior copending applications, Serial No. 220,180, filed August 29, 1962, and Serial No. 403,726, filed October 14, 1964 both entitled Seal for Rotatable Joint.

The invention is particularly useful for sealing pipe joints which are rotatably adjustable.

The present invention provides seals for pipe joints which are rotatably adjusted, for instance pipe joints which must be rotated for the purpose of positioning filling pipes over containers or onto different connections.

The seal in the present invention is provided by means of a plastic sleeve which fits between two shoulders on the outwardly flaring portions on their internal ends, and nut means provided for drawing the abutting ends almost together and forming the center portion of the plastic sleeve into a cup like shape comprising a single flexible joint.

Accordingly, a principal object of the invention is to provide new and improved pipe joint seals for stationary and rotating joints.

Another object of the invention is to provide new and improved pipe seals for rotatable pipe joints having a plastic cupped sleeve.

Another object of the invention is to provide new and improved pipe joint seals for rotatable pipe joints which are adapted to form a plastic annular cupped sleeve at the joint.

Another object of the invention is to provide new and improved pipe joint seals for rotatable pipe joints which are adapted to form a plastic cupped sleeve at the joint and having an internal metal sleeve connected to one of said pipes and extending inside of said plastic sleeve.

Another object of the invention is to provide new and improved pipe seal for rotatable joints which is adapted to hold vacuum and also high pressure without leaking.

Another object of the invention is to provide new and improved rotatable pipe joint seals wherein an increase in pressure increases the sealing force.

Another object of the invention is to provide new and improved pipe joint seal means having a flexible bellows type seal having plural ripples.

These and other objects of the invention will be apparent in the following specification and drawings of which:

Figure 1:
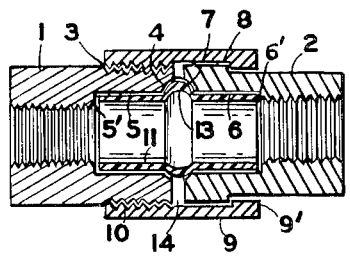
FIGURE 1 is a sectional view of an embodiment of the invention.
Figure 3:
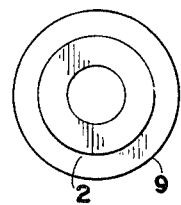
FIGURES 3 and 4 are end views of FIGURES 1 and 2.

Referring to the figures, the invention provides a seal for two abutting pipe ends 1 and 2 which may be screwed onto existing pipe in a conventional manner. The member 1 has an external threaded portion 3 and its internal end 4 is flared. The member 1 also has a larger counterbore 5 near the abutting end which forms a shoulder 5'.

The member 2 is similar to the member 1 in that it has a larger counterbore 6 forming a shoulder 6' and also has a flared internal end 7. However, instead of being externally threaded the member 2 has a flange 8. A nut 9 is adapted to be slid over the member 2 so that its internal flange 9' contacts the flange 8 of the member 2. The nut 9 has an internally threaded portion 10 which engages the threads 3 of the member 1. Other conventional means to draw the pipes together may be used.

Inside the members 1 and 2 in the spaces formed by the large counterbores 5 and 6 is placed a plastic sleeve 11 which may be of nylon, Teflon, polyethylene or other equivalent materials preferably having cold flow and lubricating properties. A straight piece of sleeve is placed inside before the connection is made. Then as the nut is drawn tight the members 1 and 2 are drawn together and due to the flaring internal edges 4 and 7, the plastic sleeve pops out at the center to form a ripple or bellows portion 13. This is because of the pressure on the ends of the sleeve 11 of the shoulders 5' and 6' of the members 1 and 2. The nut is not tightened sufficiently to draw the members 1 and 2 into contact but leaves a slight space 14 so that the members 1 and 2 may be rotatably adjusted with respect to one another without breaking the seal provided by the plastic sleeve 11. Note that the plastic sleeve is sealed by the shoulders 5' and 6' at each end and is also sealed along its outer edges against the members 1 and 2 and is further sealed by the conforming ripple 13 which is formed against the surfaces of the internal flared portions 4 and 7. Furthermore, any internal pressure on the sleeve 11 will form a tighter seal since it will force the sleeve 11 outwardly against its already sealed surfaces mentioned above. The seal will hold a vacuum as well as high pressure.

Figure 2:
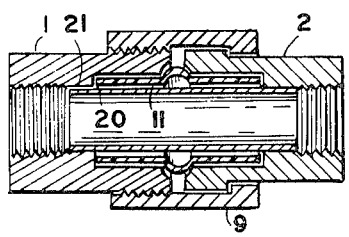
FIGURE 2 is a sectional view of another embodiment of the invention.
Figure 4:
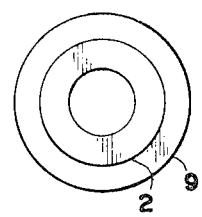

FIGURES 2 and 4 show another embodiment of the invention which is similar to the embodiment of FIGURE 1 except that in addition thereto an internal rigid sleeve 20 which may be of metal or plastic is connected to the member 1 by brazing along a portion 21. The member 20 is attached to the member 1 with a force fit and then may be silver soldered or otherwise brazed or cemented to the member 1. The metal sleeve 20 is not connected to the member 2 so that the member 2 is free to rotate.

The purpose of the rigid sleeve 20 is to limit any flexing of the joint. It will be appreciated that in the embodiment of FIGURE 1 due to the spacing between the members 1 and 2 and the flexibility of the bellows ripple 13 that there will be a certain amount of flexibility allowable in the embodiment of FIGURE 1. If it is desired to limit this flexibility, then the embodiment of FIGURE 2 may be used.

If greater flexibility is desired, then the internal flared portions 4 and 7 may be made sufficiently large so that when plastic sleeve 11 is compressed two or more ripples or bellows will be formed in the plastic sleeve. This arrangement would be more similar to that of the conventional bellows having many ripples and, of course, would be more flexible without destroying the integrity of the seal. The plastic sleeves 11 are preferably made of a non-sticking plastic for instance, Teflon, that is polytetrafluoroethylene or nylon, polyethylene, or other equivalent materials. The other components may be of metal, for instance steel or other equivalent pipe materials.

The embodiment of FIGURE 2 with the extra internal metal sleeve 20 will necessarily be stronger than that of the embodiment of FIGURE 1. However, the embodiment of FIGURE 1 is adapted to hold high pressure and vacuum leakage at a temperature up to 400° F. If this joint tends to loosen, the present seal has a spring effect which acts against the loosening force and maintains the seal.

Figure 5:
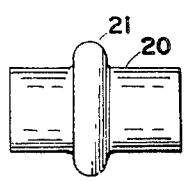
FIGURES 5 and 6 are detail views.

FIGURE 5 shows a plastic sleeve 20 which has been compressed, for instance, in a vise without any restraining covers. When a straight sleeve is compressed in a a vise tool in this manner, it will pop out and form a ripple or bellows 21 due to the compression forces.

Figure 6:
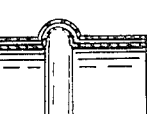

FIGURE 6 shows the modification of the invention using a pair of sleeves 22, 23 one mounted inside the other, the sleeve 23 being mounted inside the sleeve 22. This arrangement will give a particularly strong seal for extremely high pressures.

Figure 7:
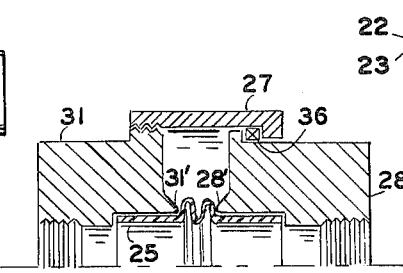
FIGURE 7 is a sectional view of another embodiment of the invention.

FIGURE 7 shows another embodiment of the invention having a double ripple in the plastic sleeve 25. This embodiment also has a thrust bearing 26 between the nut 27 and the member 28 to facilitate the rotation of the joint. The other member 31 is similar to that previously discussed.

The double ripple is preferably first partially preformed in the sleeve with a tool. The tool is similar to the embodiment of FIGURE 1. The sleeve is first inserted and a first ripple is made by drawing the pipe ends together. The pipes are then drawn and a spacer sleeve inserted, then the pipes are drawn together again and due to the spacer and a second ripple is formed. Additional ripples may be added by additional spacers. The sleeve is then inserted in the joint. The main points of contact between the member 28 and the sleeve 25 and between member 31 and sleeve 25 are the point contacts 31' and 28' which have an appreciable radius. This provides a seal with minimum friction in rotation.

This embodiment may also be made in double wall thickness of the sleeve 25 or even triple wall thickness of the sleeve 25.

The present invention has many applications that may be used whenever a stationary or rotatably adjustable seal is required. For instance, it would be quite useful in water hose where manipulation of the hose ends to unscrew the couplings causing leakage.

The flaring of the internal ends of the abutting pipe members is not absolutely necessary since the seal may be used without the flaring portions. However, in such application the spacing between the pipe ends would have to be enlarged and there would be some cutting effect caused by a sharp internal edge of the pipe against the ripple portion of the sleeve.

The plural ripple sleeve may be used in the embodiments of FIGURES 1 and 2 and the single ripple sleeve may be used in the embodiment of FIGURE 7.

The present invention therefore provides a flexible seal which automatically compensates for misalignment of the joint. The sleeve of the present seal provides separate seals at each end of the sleeve, and along the intermediate portions of the sleeve, and along the ripple edges of the sleeve. The seal is not limited to rotatable joints but may be used on stationary joints as well and for instance joints in valves, faucets, hoses, and so forth. The cup or ripple in the sleeve may be prefabricated as desired. It is not necessary in all cases to form the cup in the joint wherein it is to be used.

Many modifications may be made by those desiring to practice the invention without departing from the scope thereof which is defined by the following claims:

I claim:
1. A pipe joint comprising,
a pair of pipes each having means defining a bore and a counterbore,
said pipes being axially aligned with said counterbores in opposed relation,
a cylindrical sleeve, fabricated from a synthetic resin having cold flow and lubricating properties inserted in each of said counterbores,
said sleeve being in engagement with shoulders formed between said bore and counterbore junctions,
said sleeve being radially, outwardly expanded at substantially its midsection to form at least one integral radially outwardly projecting, symmetrical, annular bellowslike member,
the opposed radial faces of each of the pipe walls being contoured to engage said bellows member at at least the point of juncture of said expanded portion and said cylindrical portion,
said counterbores extending inwardly from said pipe terminal ends no further than a distance approximately equal to the diameter of said bore, but to a distance greater than the axial length of the bellows, and
means to retain and draw said pipe ends toward each other and to force the ends of said sleeve into engagement with said shoulders.

2. Apparatus as in claim 1 wherein said sleeve forms a plurality of axially spaced bellowslike members.

3. Apparatus as in claim 1 having an internal rigid sleeve, inside said bellowslike member.

4. Apparatus as in claim 1 wherein said pipe end faces are contoured to have an annular portion having a rounded edge in contact with said bellows sleeve.

5. Apparatus as in claim 1 wherein said retaining means incorporates a thrust bearing.

6. Apparatus as in claim 1 wherein said pipe end faces have an internal flare.

7. Apparatus as in claim 1 wherein said sleeve is laminated.

References Cited by the Examiner

UNITED STATES PATENTS

| | | | |
|---|---|---|---|
| 1,957,605 | 5/1934 | Lamont | 285—340 |
| 2,739,828 | 3/1956 | Schindler | 285—229 X |

FOREIGN PATENTS

| | | |
|---|---|---|
| 869,453 | 3/1953 | Germany. |
| 483,967 | 4/1938 | Great Britain. |

CARL W. TOMLIN, *Primary Examiner.*